Aug. 26, 1958

R. C. BAKER 2,849,245

NON-ROTARY THREADED COUPLING

Original Filed July 10, 1950

INVENTOR.
REUBEN C. BAKER
BY
Mellin and Hanscom
ATTORNEYS

Aug. 26, 1958  R. C. BAKER  2,849,245
NON-ROTARY THREADED COUPLING
Original Filed July 10, 1950  2 Sheets-Sheet 2

INVENTOR.
REUBEN C. BAKER
BY
Meelin and Hanscom
ATTORNEYS

United States Patent Office 2,849,245
Patented Aug. 26, 1958

2,849,245
NON-ROTARY THREADED COUPLING

Reuben C. Baker, Coalinga, Calif., assignor to Baker Oil Tools, Inc., Los Angeles, Calif., a corporation of California Original application July 10, 1950, Serial No. 172,925, now Patent No. 2,737,248, dated March 6, 1956. Divided and this application August 12, 1955, Serial No. 528,047

2 Claims. (Cl. 285—141)

The present invention relates to coupling devices, and more particularly to devices for enabling threaded members to be threadedly connected to each other without the necessity for relatively rotating the members themselves.

This application is a division of my application for "Non-Rotary Threaded Coupling," Serial No. 172,925, filed July 10, 1950, now Patent No. 2,737,248, patented March 6, 1956.

An object of the present invention is to provide improved couplings for threadedly connecting two members together by non-rotatably moving one member longitudinally along the other member.

Another object of the invention is to provide couplings for effecting a threaded connection between two members without rotating either of the members, in which the mating threads are held in mesh with each other without binding, so as to facilitate subsequent unscrewing.

A further object of the invention is to provide a threaded laterally movable member and another threaded member, in which the former cannot be moved laterally beyond a predetermined extent, to preclude binding of the mating threaded members against one another.

Another object of the invention is to provide a threaded connection between a laterally expansible and contractible member and another threaded member, in which unscrewing of the former from the latter is facilitated by relieving the mating force between the threads as an incident to rotation of the laterally movable member.

An additional object of the invention is to provide a threaded connection between a laterally expansible and contractible member and another threaded member, in which the laterally movable member is maintained appropriately in mesh with the other member by being positively backed at a plurality of points along its length.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings.

Figure 1:
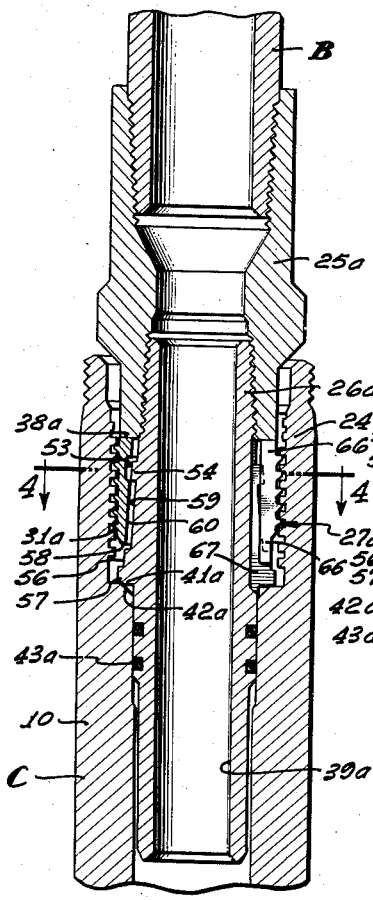
Figure 1 is a longitudinal view through one form of the invention illustrating one member of a threaded coupling being moved into another threaded member of the coupling.
Figure 2:
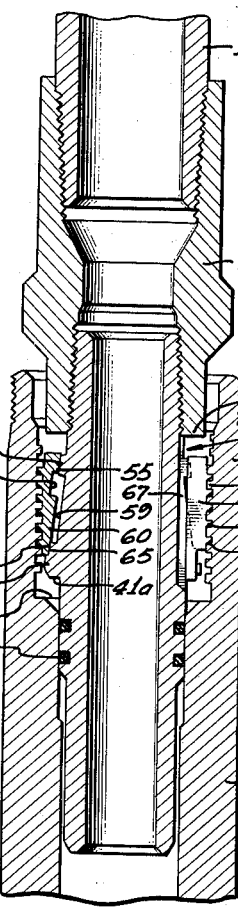
Fig. 2 is a view similar to Fig. 1, showing the mating parts of the threaded coupling fully meshed.
Figure 3:
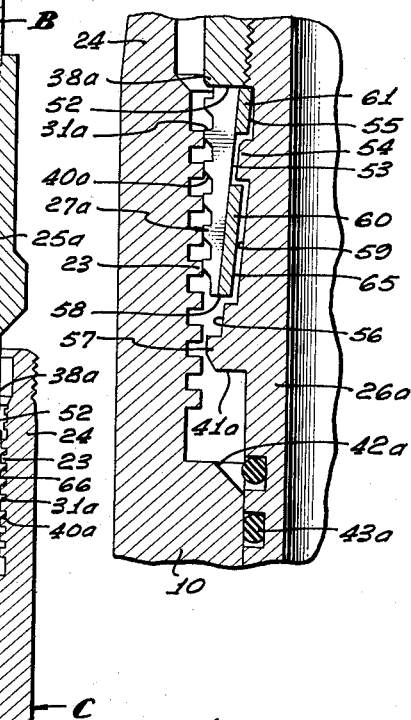
Fig. 3 is an enlarged fragmentary longitudinal section, illustrating one portion of the threaded coupling being moved into another portion of the coupling.
Figure 4:
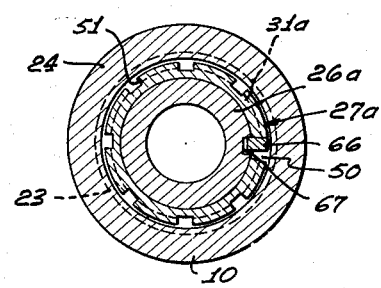
Fig. 4 is a cross-section taken along the line 4—4 on Fig. 1.
Figure 5:
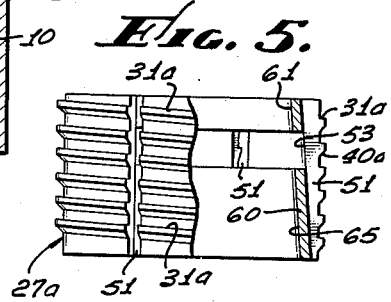
Fig. 5 is a combined side elevational and sectional view of the threaded latch member shown in Figs. 1 to 4, inclusive.
Figure 6:
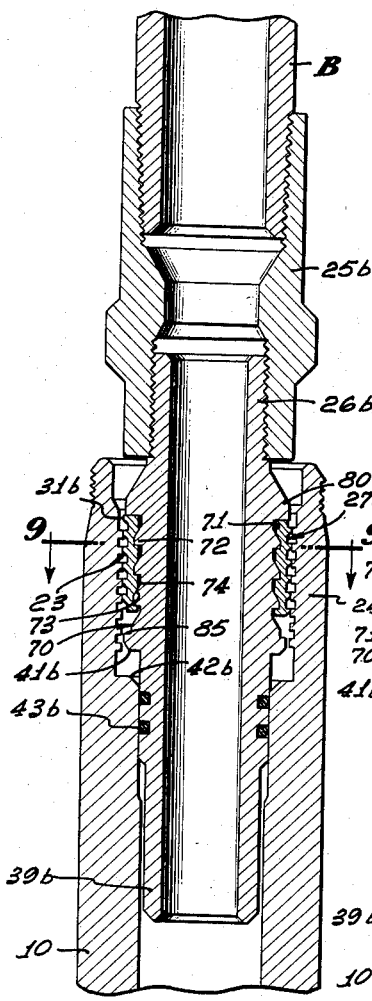
Fig. 6 is a longitudinal section through another embodiment of the invention, with one of the threaded members in retracted position and being moved longitudinally into a companion threaded member.
Figure 7:
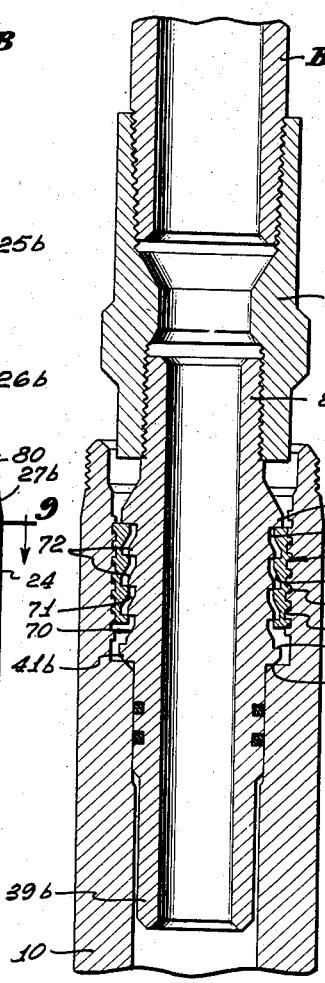
Fig. 7 is a view similar to Fig. 6, illustrating the threaded members in mesh.

The forms of invention illustrated in the drawings have been particularly designed for use in a well bore for the purpose of effecting a connection between a tubular string B, of tubing or drill pipe, and a well packer C, only the body portion 10 of which is disclosed in the drawings. Usually, the well packer has previously been anchored in packed-off condition within a well casing (not shown), and such a well packer has a threaded portion, such as a threaded box 24 at its upper end, into which the threaded coupling apparatus A of the present invention is to be moved. A threaded connection is to be made between the tubing string B and the well packer C, or other tool, without the necessity for rotating the tubing string either to the left or to the right. This is desirable, inasmuch as the threads 23 in the box 24 are usually left-hand, and if a threaded connection between the tubular string B and the packer body 10 were to be made in the usual manner, it would be necessary to effect the rotation of the tubing string in a left-hand direction, which might result in inadvertent unscrewing or loosening of some of the joints in the tubular string, which ordinarily have right-hand threads.

By virtue of the present invention, it is unnecessary to rotate the tubular string B at all in connecting it to the tool C, inasmuch as the threaded coupling apparatus A will threadedly secure the lower portion of the tubular string to the packer body 10 merely as a result of a longitudinal motion of the tubular string, and without its rotation. To effect a disconnection between the tubular string B and the packer body 10 at some later time, the tubular string is rotated, but such rotation occurs to the right, which would tend to tighten the threaded joints of the tubular string. Inasmuch as the threaded connection with the packer body 10 is a left-hand one, a right-hand rotation of the tubular string B will insure its complete disconnection from the packer body 10.

In the form of invention illustrated in Figs. 1 to 5, inclusive, a latch sleeve 27a is constituted as an integral annular member having a single longitudinal slot 50 severing it, and enabling the latch sleeve to expand and retract relative to the sub 25a, 26a on which it is mounted. In order to facilitate such expansion and contraction, for the purpose of increasing and decreasing the effective diameter of the sleeve, circumferentially spaced longitudinally extending grooves 51 may be formed in the exterior of the sleeve.

The sleeve has left-hand threads 31a on its periphery adapted to mate with the internal left-hand threads 23 in the box portion 24 of the packer body. The lower surface 40a of this thread is tapered or inclined in a downward and inward direction. The sleeve 27a is mounted on the lower sub member 26a and fits within a circumferential groove 52 formed between the lower sub 26a and the lower shoulder 38a on the upper sub portion 25a. The sleeve has a circumferential internal groove 53 adapted to receive an annular flange 54 on the lower sub member 26a, which serves to assist in holding the sleeve in threaded engagement with the body thread 23 when engaging the inner surface 55 of the upper portion of the sleeve. The lower sub member 26a also is provided with an expander and retainer surface 56 that is inclined in an upward and inward direction, and which terminates in a lower transversely extending annular shoulder 57.

The upper and lower expander and retainer portions 54, 56 project outwardly and are spaced from one another a distance greater than the distance between the lower end 58 of the sleeve and its internal groove 53, so as to form an external groove 59 into which the lower portion 60 of the sleeve may retract, when the upper flange 54 is disposed in the internal sleeve groove 53. The parts are so proportioned and arranged that the sleeve may retract or contract on the sub 26a when the flange 54 and internal sleeve groove 53, and the circumferential sub groove 59 and lower portion 60 of the sleeve, are in alignment with each other. When the sleeve 27a is fully meshed with the thread 23 in the body box 24, the flange 54 is disposed out of the sleeve groove and the sub 25a, 26a may be elevated to locate the flange 54 opposite the upper portion 61 of the sleeve, and to locate the lower expander and retainer 56 opposite the lower portion 60 of the sleeve. The extent of upward movement of the sub 25a, 26a relative to the sleeve 27a is limited by engagement of the lower terminus 58 of the sleeve with the sub shoulder 57.

Assuming that it is desired to connect the tubing string B to the body 10 of the tool, the former, with the coupling device secured to its lower end, is lowered through the well casing until the pilot portion 39a of the sub enters the body 10 and the lowermost thread turn on the sleeve 27a engages the uppermost box thread. This latter engagement precludes downward movement of the sleeve 27a, and causes the sub 25a, 26a to move downwardly to a position in which its flange 54 is in alignment with the internal sleeve groove 53, and the sub groove 59 is in alignment with the portion 60 of the sleeve. The sub shoulder 38a then engages the upper end of the sleeve and forces it downwardly, the tapered surface 40a of the sleeve thread engaging the box thread 23, which cams or retracts the sleeve inwardly with respect to the sub. The sleeve thread 31a is thereby moved out of engagement with the box thread 23, allowing the sub 25a, 26a and sleeve 27a to be shifted downwardly and fully into the threaded box 24 to the extent limited by engagement of a shoulder 41a on the lower sub member with a stop 42a on the body below its thread (see Fig. 3).

A slight upward movement of the tubing string B and sub 25a, 26a then locates the sleeve thread 31a appropriately relative to the box thread 23, and allows the sleeve to expand outwardly inherently until its thread is in full mesh with the box thread (see Fig. 1). The sub flange 54 is then longitudinally out of alignment with the ring portion 61 thereabove, and the lower expander and retainer 56 is out of alignment with the lower end 58 of the sleeve. The tubing string B and sub 25a, 26a can then be elevated with respect to the sleeve 27a, to bring the flange 54 up behind the upper portion 61 of the sleeve, and to bring the lower expander and retainer 56 up behind the lower portion 60 of the sleeve. Such positions are definitely determined by engagement of the shoulder 57 with the lower end 58 of the sleeve. With the parts in the position just described, which is exemplified in Fig. 2, the sleeve 27a cannot retract out of full meshing engagement with the box thread 23, inasmuch as the upper flange 54 provides a firm backing against the upper portion 61 of the sleeve, and the lower portion 60 of the sleeve. In effect, a spaced, two-point support is provided, holding the sleeve outwardly with its thread 31a fully and properly meshing with the box thread 23.

The lower portion 60 of the sleeve has an internal frustro-conical surface 65 converging in an upward direction for engagement with the companion surface 56 on the lower expander and retainer. These surfaces, when engaged, tend to expand the sleeve 27a outwardly. However, the extent of such expansion is limited by engagement of the sub shoulder 57 with the lower end 58 of the sleeve, by precluding further relative longitudinal movement therebetween, and, consequently, insures that only a maximum extent of wedging of the sub 26a into the sleeve 27a can occur. Accordingly, regardless of the upward pulling force on the tubing string B, the outward expansible force on the sleeve 27a cannot exceed a predetermined amount, which is determined by the engagement of the shoulder 57 with the lower end 58 of the sleeve. Without the stop shoulder 57, or its equivalent, the upward pull on the tubing string B and sub 25a, 26a would urge the sleeve outwardly and would cause its thread 31a to be urged more firmly against the box thread 23 and other portions of the box 24.

When it is desired to release the tubing string B from the body 10, it is merely necessary to rotate the tubing string, subs 25a, 26a and sleeve 27a to the right. The forward end of the sleeve has a driving key 66 secured to it along its entire length, as by welding, this key fitting within a longitudinal groove 67 in the lower sub member 26a. When the lower sub member is turned to the right, it also turns the sleeve 27a, insuring its rotation and threading in an upward direction along the box thread 23, and completely out of mesh therewith, thereby disconnecting the tubing string from the tool body.

It is to be noted that the placing of the key 66 on the forward end of the sleeve 27a, and the rotation of the sub 25a, 26a to the right causes the sub to engage the key and tend to pull the sleeve inwardly, thereby relieving its engaging forces with the box thread 23, and facilitating unscrewing of the sleeve from the latter.

In the form of invention shown in Figs. 6 to 9, inclusive, the threaded sleeve 27b has the same key 66 and groove 67 connection with the lower sub member 26b. However, the sleeve is held in threaded engagement with the box thread 23 at a plurality of points along its length.

The lower sub member 26b has a peripheral groove 70 containing annular spaces 71 and intervening flanges or expander and retaining members 72. The sleeve has internal grooves 73 and annular projections or flanges 74 companion to the flanges 72 and grooves 71 on the lower sub member 26b. The lower surface 75 of each sleeve flange is tapered in an upward and inward direction to cooperate with a companion taper 76 on the upper portion of each sub flange 72. Similarly, the inner surface 77 of each sleeve flange immediately above its tapered portion 75 is cylindrical, for engagement by a companion cylindrical surface 78 depending from the tapered portion 76 of each sub flange 72.

When the sleeve flanges 75 are located opposite the circumferential grooves or recesses 71 in the sub, the sleeve 27b can retract to an extent in which its thread 31b is out of mesh with the box thread 23. When such flanges 75 are in alignment with the sub flanges 72, then the sleeve is fully meshed with the box thread.

Figure 8:
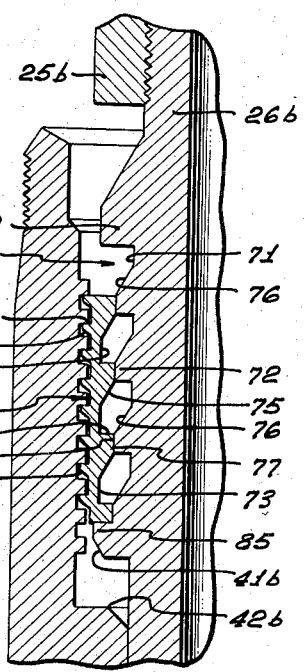
Fig. 8 is an enlarged fragmentary longitudinal section illustrating the threaded members being positively held in mesh with one another.
Figure 9:
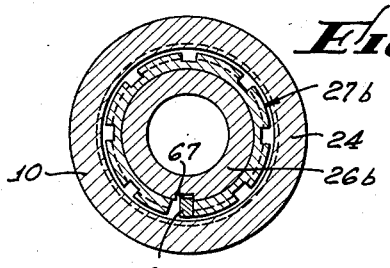
Fig. 9 is a cross-section taken along the line 9—9 on Fig. 6.

When the tubing string B is to be connected to the body 10 of the tool, it is lowered with the coupling device attached thereto through the well casing D until the pilot portion 39b of the lower sub member enters the body 10, and the lowermost sleeve thread turn engages the uppermost box thread turn. Such engagement arrests further downward movement of the sleeve 27b, and allows the sub 25b, 26b to move downwardly until its shoulder 80, defining the upper end of the uppermost circumferential groove 71, engages the upper end of the sleeve. Continued downward movement of the sub forces the sleeve 27b down against the box thread 23, which acts upon the lower inclined sleeve thread surfaces 40b and cams or retracts the sleeve 27b, as permitted by the entry of its flanges 75 into the circumferential sub grooves 71 (see Fig. 6). The extent of retraction is sufficient to bring the sleeve thread 31b out of engagement with the box thread 23, and allows the sleeve to be pushed completely into the box as a result of longitudinal movement of the sub 25b, 26b and without its rotation. The extent of this downward or complete inward movement is limited by engagement of a lower flange 41b on the sub with a cooperable stop portion 42b on the body below its thread. Thereafter, the tubing string B and sub 25b, 26b are moved upwardly, which allows the sleeve 27b to expand inherently outward into threaded mesh with the box thread (see Fig. 7). This movement may be assisted by engagement of the tapered expander surface 76 on the sub with the companion internal surfaces 75 in the sleeve, until these tapered surfaces ride off one another and the cylindrical expander and retainer surfaces 78 are located behind the companion internal cylindrical surfaces 77 in the sleeve. This location of the flanges in alignment with one another is predetermined by engagement of a lower limit shoulder 85 on the sub with the lower end of the sleeve, as illustrated in Fig. 8.

Any upward pull taken on the tubing string B and the subs 25b, 26b is then transmitted from the limit shoulder 85 to the lower end of the sleeve 27b and through the sleeve thread 31b to the box thread 23. Once the limit shoulder engages the sleeve, there can be no increase in the outward expanding force of the sub 25b, 26b on the sleeve 27b, regardless of the amount of upward strain taken on the tubing string.

When the tubing string is to be disconnected from the body, it is merely necessary to rotate the tubing string B and subs to the right. Preferably, the tubing string and subs are first lowered, so as to allow the key 66 to pull the sleeve 27b slightly inwardly, and relieve any meshing force that it might have against the box thread 23. Rotation is continued until the sleeve 27b is completely unthreaded from the box, whereupon the tubing string B, sub 25b, 26b and threaded sleeve 27b may be removed to the top of the well bore.

The inventor claims:

1. In a device of the character described: a first member having an internal thread; a second member adapted to be telescoped within said first member; an expansible and retractable split latch sleeve movable laterally and longitudinally on said second member, said latch sleeve having an external thread companion to said internal thread and meshable therewith; longitudinally spaced and lonigtudinally extending external backing portions on said second member engageable with companion longitudinally spaced and longitudinally extending internal portions on said sleeve to hold said external thread meshed with said internal thread; said internal portions being movable into spaces on said second member when said internal and external portions are out of engagement to permit said latch sleeve to retract and said external thread to come out of threaded engagement with said internal thread; at least one of said external backing portions being tapered to engage a companion taper on one of said internal portions to expand and hold said latch sleeve in threaded engagement with said internal thread; and a laterally extending stop on said second member axially to one side of said backing portions and said sleeve and engageable with an end portion of said latch sleeve to limit longitudinal movement of said second member along said latch sleeve and to locate said backing portions in engagement with said internal portions, said stop member extending laterally beyond the internal diameter of said latch sleeve, whereby the extent of outward expansion of said external thread is limited to prevent binding of said threads.

2. In a device of the character described: a first member having an internal thread; a second member adapted to be telescoped within said first member; an expansible and retractable split latch sleeve on said second member and having an external thread meshable with said internal thread; means between said second member and said sleeve to cause expansion of said sleeve and consequent engagement of the thread thereof with the thread on said first member, means between said second member and said sleeve to allow retraction of said sleeve to permit said thread engagement to be released; said sleeve being unthreaded from said first member upon rotation of said second member and sleeve in one direction; and coengageable means on said second member and leading end of said sleeve adjacent the split of the sleeve for transmitting rotation of said second member in said one direction to said sleeve to contract said sleeve and release said threads from each other and unthread said sleeve from said first member.

References Cited in the file of this patent
UNITED STATES PATENTS

| | | |
|---|---|---|
| 520,952 | Cox | June 5, 1894 |
| 1,637,056 | Segelhorst | July 26, 1927 |
| 1,909,601 | Young | May 16, 1933 |
| 2,498,791 | Clark | Feb. 28, 1950 |
| 2,644,524 | Baker | July 7, 1953 |
| 2,737,248 | Baker | Mar. 6, 1956 |